A. J. GIBBONS.
SHOCK ABSORBER.
APPLICATION FILED NOV. 24, 1919.

1,373,066.

Patented Mar. 29, 1921.

INVENTOR.
Arthur J. Gibbons
BY
Bradford, Morrill & Binman
ATTORNEYS.

UNITED STATES PATENT OFFICE.

ARTHUR J. GIBBONS, OF INDIANAPOLIS, INDIANA, ASSIGNOR OF ONE-THIRD TO STACE B. LINDLEY AND ONE-THIRD TO HORACE B. HEWITT, BOTH OF INDIANAPOLIS, INDIANA.

SHOCK-ABSORBER.

1,373,066.  Specification of Letters Patent.  Patented Mar. 29, 1921.

Application filed November 24, 1919. Serial No. 340,100.

*To all whom it may concern:*

Be it known that I, ARTHUR J. GIBBONS, a citizen of the United States, residing at Indianapolis, in the county of Marion and State of Indiana, have invented certain new and useful Improvements in Shock-Absorbers, of which the following is a specification.

This invention relates to shock absorbers particularly adapted for vehicles, such as motor cars, intended to operate in conjunction with the ordinary springs of such vehicles to absorb shocks and jars incident to travel on rough roads. Most of the shock absorbers previously constructed were only partially effective in that they tended to prevent only the downward movement of the vehicle body and were incapable of eliminating the side swaying or effectively checking the rebound of the body, which are very marked in light cars, such as the Ford. It also required considerable time and trouble to attach such shock absorbers to the vehicle.

These disadvantages of prior absorbers are obviated by my invention, it being among the objects thereof to produce a shock absorber for vehicles which is simple in construction, can be easily attached to a vehicle, which is capable of absorbing shocks and rebounds, and which eliminates the side swaying of the car. In carrying the objects of my invention into effect, I provide a plurality of sets of springs, each set generally comprising two springs separated by a member interposed between the same and fixed to the ordinary leaf spring of the vehicle. The holding means for the sets of springs is suitably connected to a leaf spring eye and to the automobile axle in such a manner that all shocks received by the axle are transmitted to the holding means and are absorbed by the springs operatively connected thereto.

Figure 1:
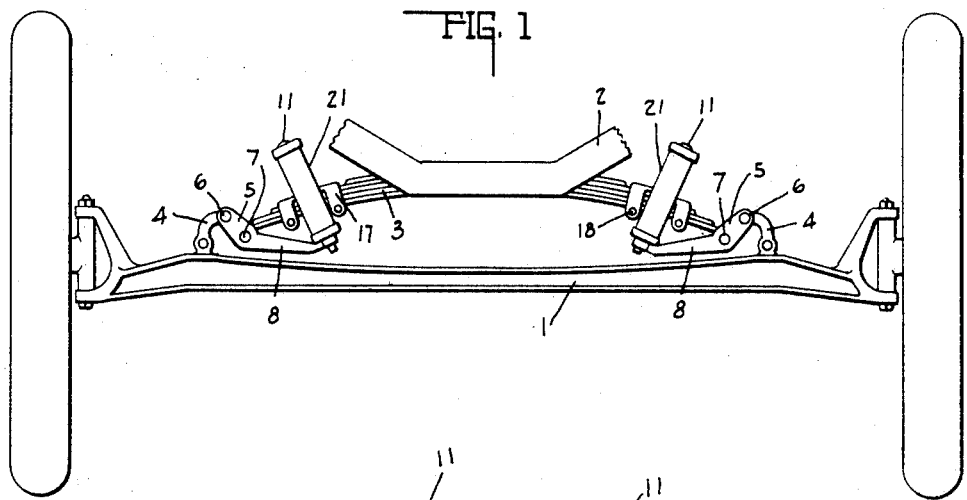
Figure 2:
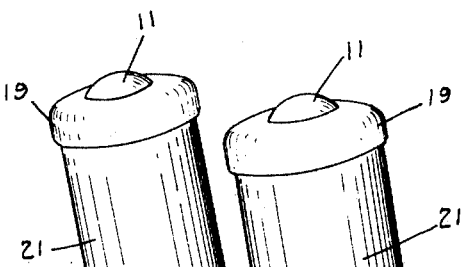
Figure 2:
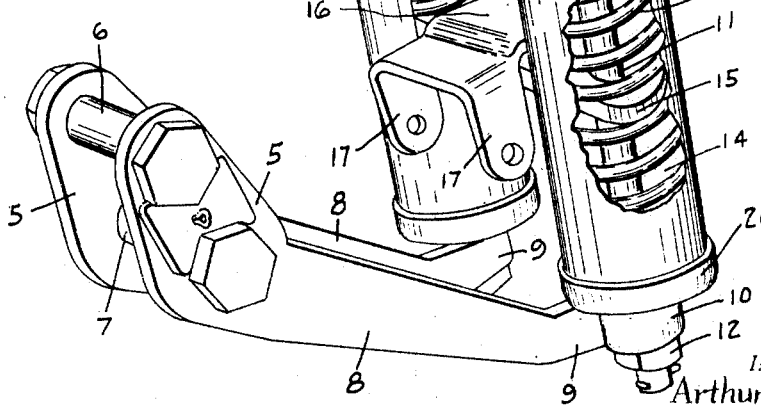

Referring to the accompanying drawings forming a part hereof and in which similar reference characters denote similar parts, Figure 1, is a front view of an automobile showing my improved shock absorber in place, and Fig. 2, is an enlarged detail view of the same, a portion of the spring casing being shown broken away.

Carried by the axle 1 of the motor car is the body 2 which carries the springs 3 which are ordinarily connected to the axle 1 through the perch hanger 4 and shackle 5 which is pivoted to the perch hanger at 6 and to the leaf spring at the spring eye 7. According to my invention the shackle 5 is formed with an extension 8 forming a lever, the extension being provided with an end portion 9 carrying a collar 10; two such shackles with their extensions are provided so that such extensions lie on either side of the leaf spring.

Bolts 11 are secured to collars 10 by means of nuts 12. Mounted on such bolts are pairs of springs 13 and 14 separated by a plate absorbing means 15 which extends through both sets of springs, the plate 15 having openings therein for the reception of the bolts 11. A clip having downwardly extending ears 17 embraces the central portion of plate 15 and is adapted to be clamped down on the leaf spring by bolts 18 to hold the same in fixed relation to the spring. Caps 19 and 20 are provided on the top and bottom respectively, of the bolt members in order to more securely hold the springs 13 and 14 respectively, in position. A cover casing 21 protects the springs from dirt and dust.

As the vehicle travels along the road any shocks and jars are transmitted by the wheels to the axle 1 through the perch hanger 4 and to the shackle 5. If the wheels strike an elevation in the road the tendency of the shackle is to oscillate around the pivot 6 in such a direction as to cause the body 2 to move downwardly. With my shock absorber in position, as shown in Fig. 1, the force transmitted by the shackle 5 is at least partially dissipated in the compression of spring 13 which effectually absorbs most of the shock, and on the rebound the spring 14 is compressed, thus preventing the up and down motion due to rough roads. The side swaying of the car is also absorbed or prevented in a similar manner, the absorbers on both sides coöperating to produce this result, the upper springs of the set on one side being compressed and the lower springs of the set on the opposite side being also compressed when the sway is in one direction and the lower springs of the first set and the upper springs of the second set being compressed when the sway is in the opposite direction.

Having thus fully described my said invention, what I claim as new and desire to secure by Letters Patent, is:

1. In a shock absorber a set of springs, and means for holding the same in yielding relation to a vehicle axle, and absorbing means interposed between the springs of the said set, said means arranged to be fixed to a vehicle spring.

2. In a shock absorber a set of springs, and means for holding the same in yielding relation to a vehicle axle comprising a bolt passing through said set of springs, a lever comprising a spring shackle, and an extension thereof, said bolt being fixed to said shackle, and absorbing means interposed between the springs of said set, said means arranged to be fixed to a vehicle spring.

3. In a shock absorber a pair of spring shackles having extensions formed therewith, a set of springs for each of said extensions, said sets arranged to be secured on opposite sides of a vehicle spring.

4. In a shock absorber a pair of shackles having extensions formed therewith, a set of springs for each of said extensions, a plate interposed between the springs of both sets, and means for holding said plate to a vehicle spring.

5. In a shock absorber a pair of spring shackles having extensions formed therewith, a set of springs for each of said extensions, said sets arranged to be secured on opposite sides of a vehicle spring, a plate interposed between the springs of both sets, and means for holding said plate to a vehicle spring.

6. In a shock absorber two substantially parallel sets of coil springs, each set comprising two springs in alinement, a single plate interposed between the individual springs of each set, said plate arranged to be secured to a vehicle spring, and means for operatively connecting said sets of springs to a vehicle axle.

7. Means for preventing side swaying of a vehicle comprising sets of shock absorbers placed on opposite sides of said vehicle arranged to be operatively connected to the axle and secured to the springs thereof, spring shackles, shock absorber springs, the springs of said absorbers being directly connected to the spring shackles of the vehicle and restricting the movement of said shackles.

In witness whereof, I have hereunto set my hand and seal at Indianapolis, Indiana, this 19th day of November, A. D. nineteen hundred and nineteen.

ARTHUR J. GIBBONS. [L. S.]

Witnesses:
MARTHA MARTINDALE,
H. V. BIERMAN.